United States Patent [19]

Chambors et al.

[11] Patent Number: 4,586,094
[45] Date of Patent: Apr. 29, 1986

[54] METHOD AND APPARATUS FOR PRE-RECORDING TRACKING INFORMATION ON MAGNETIC MEDIA

[75] Inventors: John M. Chambors, Canton; Francis Lum, Ann Arbor, both of Mich.

[73] Assignee: Irwin Magnetic Systems, Inc., Ann Arbor, Mich.

[21] Appl. No.: 589,007

[22] Filed: Mar. 13, 1984

[51] Int. Cl.$^4$ .............................................. G11B 5/54
[52] U.S. Cl. ........................................ 360/77; 360/78
[58] Field of Search ............................. 360/75, 77, 78

[56] References Cited
U.S. PATENT DOCUMENTS

| | | | |
|---|---|---|---|
| 4,390,917 | 6/1983 | Watanabe | 360/128 |
| 4,414,589 | 11/1983 | Oliver et al. | 360/77 |
| 4,414,593 | 11/1983 | Miller et al. | 360/102 |
| 4,472,750 | 9/1984 | Klumpp et al. | 360/78 |
| 4,476,503 | 10/1984 | Solhjell | 360/75 |

*Primary Examiner*—George G. Stellar
*Attorney, Agent, or Firm*—Price, Heneveld, Huizenga & Cooper

[57] ABSTRACT

A method and apparatus for initializing a data-recording media, particularly tape, by use of the same type of media drive used for data-recording purposes, in which the actual edge of the recordable field on the media is first located by a test read/write process and the media is then transported in a succession of passes across the transducing head, during each of which the head is periodically and selectively energized to write mutually-spaced marker bursts and servo-positioning bursts, with the transducing head being moved open-loop a distance corresponding to a half-track width between each media transport. During the first such pass, the marker bursts and servo-positioning bursts are located on the basis of tape travel distance, and on successive passes burst location is determined by sensing the previously-recorded marker and servo bursts and timing-out a predetermined distance therefrom by use of an internal clock. In the case of tape-form media, tape transport and transducer-positioning is carried out in a serpentine pattern.

27 Claims, 25 Drawing Figures

METHOD AND APPARATUS FOR PRE-RECORDING TRACKING INFORMATION ON MAGNETIC MEDIA

FIELD OF THE INVENTION

This invention relates broadly to techniques for achieving higher recording track densities in data storage apparatus, e.g., tape and disc drives, especially tape drives. More particularly, the invention relates to improvements in embedded servo technology as applied to such data storage apparatus and, more particularly still, the invention relates to improvements in techniques for initializing the storage media prior to its intended use by pre-recording head-positioning information thereupon so that ensuing use as a data storage medium may be carried out by continuous servo-positioning of the transducer head to maintain it in alignment with desired recording tracks already defined on the recording media.

BACKGROUND OF THE INVENTION

With the increasing use of word-processing and data-processing apparatus utilizing computer technology, there has been a widely-recognized desire far greater amounts of data storage per unit of storage media, and this has brought about the need for advancements in the associated technology to achieve ever-greater, bit-packing densities as well as greater track densities. One achievement resulting from this requirement has been the development and use of embedded servo techniques, in which closely-spaced recording tracks on the media are predefined by positioning information recorded on the storage media prior to its use for actual data storage operations, by which closed-loop servo-positioning may be used to follow the pre-recorded tracks. While there have been different proposals for different embedded servo information formats, one particular such format viewed as having a number of advantages, particularly when used with magnetic tape media (with respect to which few developments have as yet been realized) is disclosed and claimed in previously-filed and copending U.S. Pat. application Ser. No. 280,138, now U.S. Pat. No. 472,750, assigned to the assignor of the present invention. The disclosure in that application is to be deemed incorporated herein by reference.

Typically in the use of embedded servo techniques, the head-positioning information is pre-recorded on the media by the manufacturer of the storage device, i.e., the disc drive or tape drive. This is virtually an essential requirement, since it goes without saying that if the recording tracks are to be so densely packed as to require closed-loop servoing techniques in order to keep transducer head in alignment with a selected track for data-recording or data-reading purposes, one would not anticipate that the storage device would be able to locate and follow the desired location for each such track prior to the time the positioning information has been recorded on the storage media. Thus, the servo-writing process, by which the head-positioning information is pre-recorded on the storage media to define the closely-packed recording tracks, has generally been considered as requiring specialized and expensive apparatus, available only at the manufacturer. For example, the servo-writing apparatus heretofore used has had to embody very accurately controlled recording-media transport capabilities, so that there will be virtually no speed variation along each different track. Further, the path of movement followed by the recording media in transport must be very accurately controlled with respect to the recording head, or transducer, to guard against the inherent variations and non-linearities in mechanical transport systems. A similar factor is the need for a very high degree of stability in the support structure for both the media and the drive itself. Considering the exceedingly narrow widths and closely-packed relationship of the various recording tracks to be defined on the media, this requirement has involved the use of massive support tables and footings for the servo-writing apparatus.

The resultant high cost of servo-writing units has essentially mandated that only the manufacturers of the media or of the storage devices (drives) have such equipment, and this in turn has meant that the pre-recorded media was available only from such manufacturers even though the media itself, absent the pre-recorded positioning information, is available from many sources. This has imposed added expense and added inconvenience for the end user, particularly in instances when the pre-recorded media is in short supply or temporarily unavailable.

SUMMARY OF THE INVENTION

The present invention provides methods and apparatus for obviating the aforementioned shortcomings and difficulties associated with prior art practices and, in particular, is addressed to advantageous techniques for initializing magnetic data storage media by pre-recording head-positioning information thereupon in a manner defining the recording tracks to be utilized in actual operation. While the improved techniques and apparatus in accordance herewith are in a broad sense applicable to various forms of recording media (e.g., magnetic disc), special value is found in connection with use on magnetic tape.

In accordance with the invention, the improvements provided make possible the practice by which the end user is able to initialize his own recording media by use of his own storage device, (e.g., tape drive), so that units of blank recording media (e.g., tape cartridges) may be purchased from any supplier of the general type of media desired. The invention thus provides a substantial improvement in actual practice, manifested by savings in both time and money, and in particular by avoiding unnecessary delays in processing caused by the lack of availability, or by limited availability, of the desired pre-initialized media.

The foregoing major objectives and advantages of the invention, together with others of further value, will become more apparent upon consideration of the ensuing specification and of the appended drawings.

BRIEF DESCRIPTION OF THE DRAWINGS

In the drawings:

FIGS. 1, 2, 3 and 4, consisting of a and b, are reproduced from aforementioned copending application Ser. No. 280,138 now U.S. Pat. No. 4,472,750 and illustrate a preferred format for servo-positioning information particularly applicable to tape-form recording media, in conjunction with which the media-initializing techniques of the present invention will be explained;

DESCRIPTION OF PREFERRED EMBODIMENTS SERVO FORMAT

Figure 1:
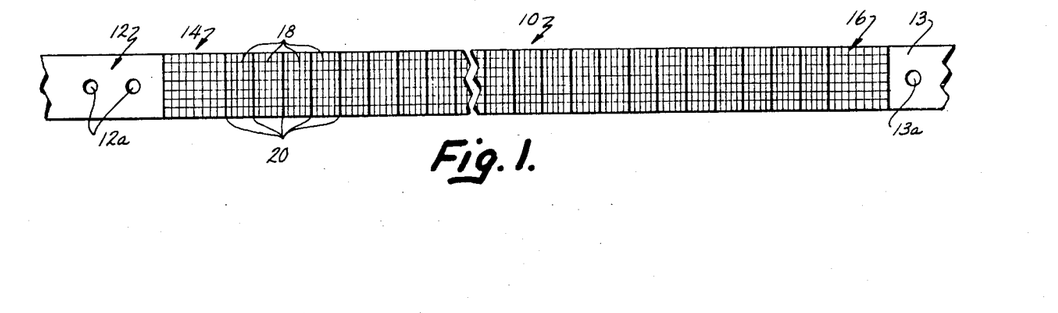
Figure 2:
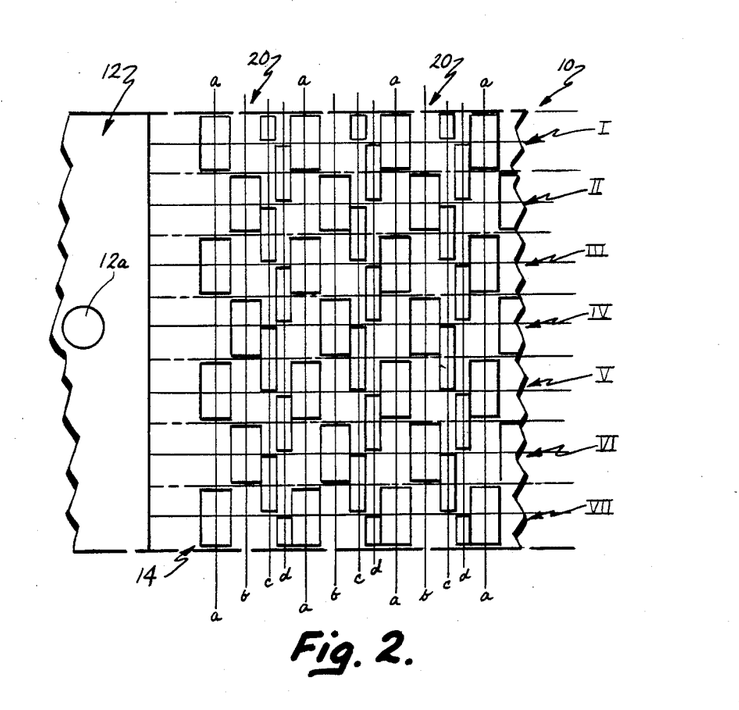

As indicated above, FIGS. 1 and 2 are reproduced from copending application Ser. No. 280,138, now U.S. Pat. No. 4,472,750 and depict an illustrative, but preferred, embedded servo format and system in connection with which the present method and apparatus for initializing data storage media by pre-recording transducer-positioning information thereupon will be explained.

Basically, FIG. 1 illustrates an elongated segment of data-recording media (in the most preferred embodiment constituting magnetic tape, but in a broader sense also applicable to disc and other forms of storage media). In this illustrative embodiment, the elongated segment of recording media 10 is arranged to have dedicated areas 14 and 16 of continuous positioning information disposed at its beginning and end, respectively. Where the media is magnetic tape, there would typically be lead-in portions 12 and 13 at the opposite end extremities of the tape, in which there are conventionally provided beginning-of-tape ("B.O.T.") indicia 12(a) as well as end-of-tape ("E.O.T.") indicia 13(a), such indicia typically constituting light-passing apertures or the like detectable by optical sensing means. Between the beginning and ending areas 14 and 16 of continuous positioning information, there are a large number of data blocks or sectors 18, in which the user stores operational data as for word-processing or data-processing purposes, and each of the various data blocks 18 is separated from one another by "embedded" transducer-positioning information blocks 20. As will be understood, it is desired that the media be formatted to include a large number of closely-adjacent data tracks extending lengthwise of the media, such tracks being represented pictorially in FIG. 1 as a plurality of horizontally-extending spaces delineated by lightly-drawn horizontal lines.

The dedicated area 14 of the record member 10, mentioned briefly above, is shown in more detail in FIG. 2, wherein the different recording tracks are designated I-VIII, inclusive. As schematically illustrated in FIG. 2, each individual such track in area 14 (and in area 16) has a repetitive pattern of the positioning signal blocks 20, each of which may for purposes of illustration be subdivided by the vertical indicia or ordinates a, b, c and d. Further, the odd-numbered tracks I, III, V, and VII are essentially identical, as are the even-numbered tracks II, IV, VI and VIII. While the odd-numbered tracks are similar to the even-numbered ones, they are organized somewhat differently, as discussed hereinafter, and it will be observed that the recorded blocks in the odd-numbered tracks are not in lateral registration (i.e., not aligned along the ordinates a-d) with the analogous blocks in the even-numbered tracks.

As already indicated, the major portion of the record member 10 is formated to have repetitive, alternating user data fields 18 which are set apart from one another by what have been referred to as recorded positioning information blocks 20; in fact, the latter comprise what may be referred to as "servo burst," fields or "positioning records," which include both an encoded track-identification address and servo-positioning tracking signals, or blocks of signals. This general format is illustrated schematically in FIG. 3, in which successive data record fields 18, 18' are shown in a representative way to include a large number of closely-spaced signal transitions, which may for example be on the order of eight kilobytes, typically including not only user data per se but also such things as field markers, data headers, error check codes, etc. It is contemplated that the various record fields 18, 18' are written in modified FM (MFM) according to conventional data-writing techniques. The positioning information in the fields 20 are another matter, however, and the preferred format for these is illustrated in FIG. 3.

Figures 3, 4A:
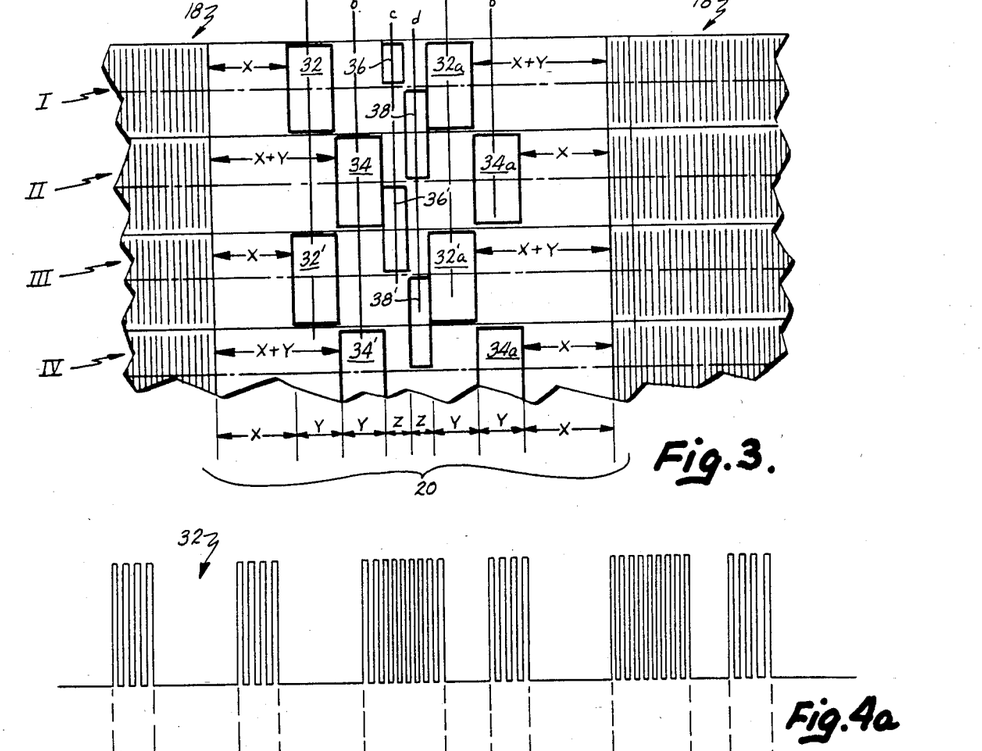

As shown in FIG. 3, interspersed between each of the various record fields 18, 18', in which the user's data is recorded, are the aforementioned "servo burst" fields 20. In fact, each such servo burst field 20 includes several distinct signal records, in particular, an encoded track-identifying header block 32 (odd-numbered tracks) or 34 (even-numbered tracks), followed (as viewed from left to right) by first and second "A" and "B" servo-positioning bursts 36, 38. The header blocks 32, 34 are centered upon the centerline of each of their respective recording tracks, but the servo-positioning bursts extend in opposite directions with respect to such centerlines and are disposed in immediately-sequential relationship along the track, i.e., one immediately following the other along their track.

More particularly, it should be noted first that whereas in the illustrated embodiment each of the data fields 18 in each adjacent track terminates at the same point along the tape, on a track-to-track basis, such lateral registration is not in a strict sense an absolute requirement of the present servo-writing pattern and system. The depicted coterminous arrangement does, however, serve to illustrate a likely or even preferred pattern or arrangement, and helps to illustrate certain characteristics of the servo burst blocks. Concerning the latter, it will be noted that certain particular erased gaps (i.e., non-recorded segments) are located at the end of the user's data blocks 18, i.e., at the start of each of the servo blocks 20. More particularly still, one type of such a gap, designated "x," appears in the odd-numbered tracks between the end of data fields 18 and the header blocks 32. A different and longer erased (i.e., unrecorded) gap exists between the end of the user's data blocks 18 and the even-numbered tracks and the position of the first header blocks 32 to the right in those tracks. The length of this second type of gap equals the length of gap "x" plus the length "y" of header 32; thus, the second such gap has a length of x plus y. In accordance with a preferred embodiment of this format, representative such tape lengths, in terms of time (neglecting speed variations) are: gap x=4 milliseconds, duration y (which is the length of the header blocks 32, 34)=2.2 milliseconds, and duration z (which is the length of the track-following servo bursts 36 and 38)=1 millisecond. These relative durations are approximated in a proportional sense by the corresponding blocks depicted in servo burst 20 in FIG. 3.

With further reference to FIG. 3, it will be noted that in the odd-numbered tracks, such as tracks I and III, a second track-identification header 32(a) appears to the right of the second servo burst 38, leaving an unrecorded gap of a duration x plus y between the end of header 32(a) and the block of user's data 18' immediately to the right. In the even-numbered tracks, a second header block 34(a) is also present within each servo burst area 20, and is located to the right of the second track-positioning servo burst 38, but at a distance therefrom corresponding to gap y. Thus, between the right-hand edge of each header block 34(a) in the even-numbered tracks and the next block of user's data 18' to the right, there is an unrecorded gap of a duration x.

It will thus be seen that the "positioning information" components (i.e., both the track-identification and the track-following signal blocks) in the servo block 20 of the odd-numbered tracks are all similarly positioned, and the counterpart information, or recorded signals, in each of the even-numbered tracks is analogously, but differently, positioned; i.e., the recorded signal blocks in the odd- and even-numbered tracks are in a sense complementary, but they have specifically differing locations. In the first place, the header blocks 32 and 34 are not laterally aligned on a track-to-track basis, but instead follow one another successively from the standpoint of track length. Thus, the odd-numbered tracks have a gap x between the end of the user's data blocks and the first header block 32, whereas in the case of the even-numbered tracks, there is a gap of length x plus y in that position; conversely, after the last (second) header block 32(a) in the odd-numbered tracks and the next ensuing block of user's data 18', there is a gap of a duration x plus y, whereas in the analogous position in the even-numbered tracks there is a gap of only duration x. It may thus be seen that the recorded signal pattern in the servo burst 20 in odd-numbered tracks takes the following form, from the standpoint of duration: an unrecorded or erased gap x, a header burst of duration y, an unrecorded gap of duration y, a positioning burst of one polarity for a duration z, a second positioning burst of the opposite polarity for a duration z, a second header for a duration y, and an unrecorded gap of a duration x plus y. In the even-numbered tracks, the burst-gap pattern is the reverse. This basic pattern or format may be used as a preliminary or overall synchronization pattern, to provide a check which insures that a given pattern of signals transduced from a given record track is, in fact, a servo burst block 20, i.e. failure of the synchronization pattern at any point along its length resulting in microprocessor-controlled reinitialization of the servo loop and circuitry.

Figure 4B:
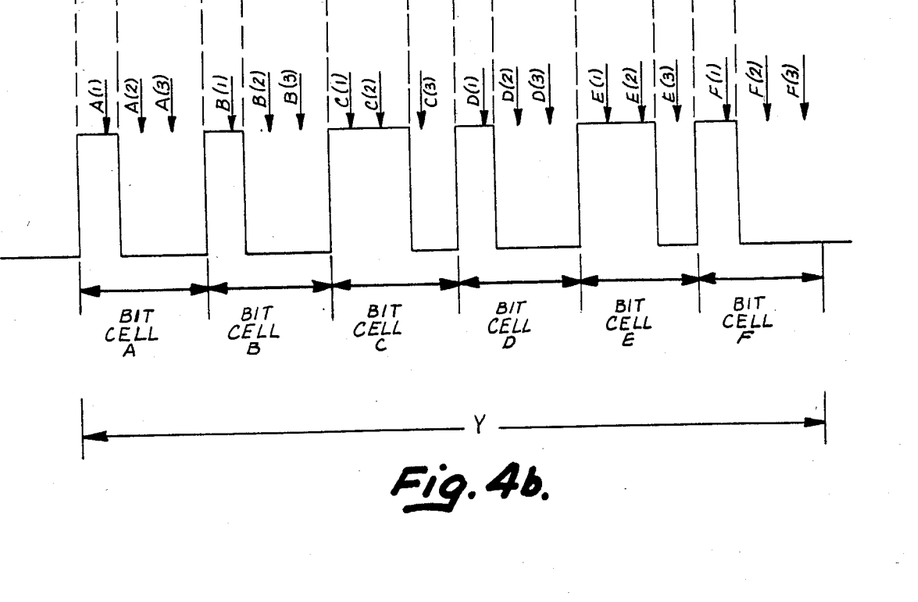

An examplary track-identification header 32 occurring over the duration y is illustrated in more detail in FIGS. 4(a) and 4(b), the basic nature of which generally characterizes any of the header blocks 32 or 34 (or, as explained more fully herebelow, the header blocks 32[a] and 34[a]). As illustrated in FIG. 4, the period or duration y is in effect subdivided to form a desired number of bit cells labelled A-F inclusive. During each such bit cell, a burst of uniform-frequency signal is recorded (for example, square waves at a frequency such as 125 kHz. The duration of these bursts, or their presence at successive sampling points, in accordance herewith, determines whether the bit cell has a logic value of a binary zero or a binary one. More particularly, in accordance herewith, the detected headers, 32, 34 are sampled or detected, a number of successive times (preferably at regular intervals commencing asynchronously) during specified divisions (for example each one-third) of each total bit cell duration. Representative of typical sample points are shown individually, for purposes of illustration, in FIG. 4(b) by the arrows A(1), A(2), A(3), B(1), B(2), B(3) etc. each of which may be understood to represent a spaced grouping of different distinct samples occurring during that bit cell. As explained more fully in copending application Ser. No. 280,138, the preferred sampling technique is to employ peak-detecting means and to selectively enable such means a desired number of times at regular intervals during accurately-timed bit cells, by microprocessor control.

However particularly accomplished, the sampling or detecting process will be seen to produce a resultant binary-type coded signal grouping. With reference to the signal pattern depicted in FIG. 4(a), and sampling or detecting at various points as aforementioned, if a binary zero is the value ascribed to a signal-present condition existing at a first detection point (for example, A[1]), but absent at the next two ensuing points (A[2] and A[3]), such as is true of bit cells A, B, D and F, and ascribing a binary one value to the situation where signal presence is detected at both of the first two such sampling points, but not at the third such point, as is true for example in bit cell C and bit cell E, the resulting encoded address for the header 32 depicted in FIG. 4 would be 001010.

In the system just described, the header encoding for headers 32 and 34 may be accomplished in a left-to-right sequence, whereas the encoding of headers 32(a) and 34(a) may be in a right-to-left, or reverse, sequence. That is, while a sequence of logic zeros and ones will indeed identify a given particular track, the logic sequence will be different depending upon whether it is being read from the left or from the right, and it may at times happen that the enabled transducer gap is aligned over a track then being moved in the "wrong" direction. Thus, if an "erase" (i.e., unrecorded) gap of x plus y duration is the first thing encountered or "read," the transducer could either be positioned over an odd-numbered track with the tape being transported from right to left, or it could be positioned over an even-numbered track with the tape being transported from left to right, the mere occurrence of a verified six-bit address header not in and of itself necessarily indicating actually meaningful information. If the address headers positioned at what should be the end of the servo burst block, (i.e., headers 32[a] or 34, in a back-and-forth or alternating track-recording sequence) are encoded in reverse format, the track address which they embody will be properly "read" and "understood" by the system, and the actual direction of record member motion may thus be accommodated and/or verified.

The servo-positioning bursts 36 and 38 are, in accordance herewith, contemplated as being continuous, timed bursts of uniform-frequency signals, of approximately the relative duration indicated previously (i.e., on the order of one millisecond) as generally depicted in FIG. 3. As seen there, each such servo-positioning burst is positioned over half of each of two adjacent tracks (except, of course, for the edge tracks such as that designated track I). Thus, servo burst 38, for example, will be "read" by a transducer centered on track I and also read by a transducer centered on track II, and the same is true of the servo-positioning bursts designated 38', which are shared between tracks III and IV. Similarly, servo-positioning bursts such as 36' are shared between tracks II and III. Compared to the duration of each individually-detected "bit" or burst in the bit cells of the headers, it will be appreciated that the continuous servo-positioning bursts are of long duration, i.e., approximately six times the length of each individual header "bit". This not only provides for virtually certain distinction between the two, but also provides for considerable certainty in the accurate determination of the particular amplitude detected from each servo burst, during positioning, as described subsequently.

The track-identifying headers 32, 34, unlike the servo bursts 36, 38, are each centered upon their own respective data-recording tracks, and are not shared between, or read by, a transducer centered upon the adjacent track. Also, it will be noted that while the track-identification header records are approximately a full track-width wide, they are not aligned laterally with one another from track to track, but are instead offset from one another with respect to the track length. Thus, a transducer located between tracks I and II, for example, will first read the lower half of header 32 and then the upper half of header 34, thus maintaining the integrity, and understandability, of the digitally-encoded track identification embodied in each respective header. That is, binary-encoded track address bits from two separate tracks will not be read at the same time, or during the same block of time.

The servo-positioning bursts 36, 38, being comprised of single-frequency and single-amplitude signals, thus constitute amplitude-type transducer-positioning embedded servo information, detection and use of which in a closed-loop servo-positioning system will enable a transducer to seek a selected track, and to "follow", i.e., remain centered upon such track, through known A-B amplitude-comparison techniques. That is to say, a transducer generally aligned with track I, for example, will (after encountering erased gap x and track-identifying header 32) first encounter servo burst 36 and then encounter servo burst 38. If the transducer is at that time more nearly aligned with burst 36 than it is with burst 38, a difference in amplitude will be detected, and that difference may be utilized to generate an error signal which, by closed-loop servoing techniques, may be used to move the transducer a particular amount in an indicated direction to bring it more nearly onto the track center, directly between the two servo bursts.

In accordance with the foregoing, it will be seen that the servo burst area 20 is encoded so that (where the odd-numbered tracks are read from left to right, and the even-numbered tracks are read from right to left) a transducer head following generally along a recording track will first encounter an erased or unrecorded gap of duration x, will then encounter a digitally-encoded track-identifying header of duration y, will then encounter an erased gap of duration y, will then encounter a servo burst of duration z which is representative of positioning in the direction corresponding to the upper portion of the recording track (as depicted in FIG. 3), will then immediately encounter a second servo burst of duration z representative of positioning in the direction corresponding to the lower half of the recording track, and will then immediately encounter a reversely-encoded track-identification header of duration y. Following that, the next thing to be encountered is an unrecorded gap of duration x plus y, followed by the next ensuing block of user's data 18', which would, of course, be recorded left to right in the odd-numbered tracks and right to left in the even-numbered tracks.

Referring once again to FIGS. 1 and 2, and particularly to the dedicated areas 14 and 16 at the beginning and end of the record member (or of a sector or segment of a record member), such dedicated areas preferably comprise continuously-repeating servo burst blocks of the type generally designated by the numeral 20 in FIG. 3. The feature of a dedicated area 14 or 16 is particularly advantageous in the case of a record member 10 comprising tapeform media, especially where the intended or most frequently-expectable mode of use is to have the tape begin motion at one end or the other, most typically, running in a continuous motion until the other end is reached, although intermittent motion during medial portions of the tape is also a possible procedure.

SERVO WRITING

The present invention is particularly directed toward the methodology by which the various positioning signals (i.e., both the forward and the reverse headers, as well as the A and B servo-positioning bursts, and certain "marker signals" to be described hereinafter) are recorded (i.e., "written") on the recording media. That is, prior to the actual use of the media for its intended purpose as a data storage medium, by recording the user's data in its allocated positions, the above-described format of "positioning signals" must of course be recorded on the media in some manner since the media is completely blank when obtained from the manufacturer. While "embedded servo" and other such positioning information can be (and has heretofore been) recorded on storage media at the manufacturer's or supplier's facility in a painstaking manner, by the use of expensive and specialized "servo writers", in accordance with the present invention the preferred way of so "initializing" the recording media is to utilize the end-user's own drive, or recording device, and to implement the preferred methodology by way of a prescribed routine, preferably by way of programmed microprocessor control. By so doing, substantial operational advantage and flexibility are obtained, as well as desirable cost savings and economies.

Broadly considered, the "servo writing" process in accordance with the invention is to first accurately locate the actual edge of the recording media, (or of the functional recording field on the media, if that is different from the edge of the media itself), and then to progressively step the read/write transducer head laterally across the recordable field of the media in a step-by-step process, temporarily retaining the head at each of a series of successive positions which are one-half track apart from one another, and with the head temporarily held in such positions selectively enabling it to record a series of positioning bursts whose width is a full track wide and which are located at particular positions along the length of the recording media, in an aligned sequence. The various recorded bursts of "positioning information" are of different lengths, or duration, since they are ultimately to serve different purposes; that is, certain of such bursts constitute the preferred form of track-identification header as described above while others constitute the A and B servo-positioning bursts. Additionally, certain of the recorded bursts merely constitute "marker bursts" which do not actually play a part in either the track-identification or of the servo-positioning processes.

The first such aligned sequence of recorded bursts is placed on the recording media along the edge of the located recordable field in a particularly-timed sequence based upon the total length of the recordable field (length of media) and the known or located ending portions of the recordable field. Subsequent aligned sequences of positioning bursts recorded on the media are also precisely timed, but the timing and placement are based upon detection of the previously-recorded bursts lying next adjacent those then being written, i.e., one-half track away, the bursts being offset from one another and in effect interleaved, at least partially (i.e., by half a track), between one another. In this manner, the process is carried forward by making a number of transducer steps and media runs or transports, until the recordable field has its full complement of positioning information.

Referring more particularly to the procedure just described in broad terms, reference is made to FIG. 5, whose various sequential parts visually illustrate the overall procedure in a step-by-step manner. Also, reference is made to FIG. 6, which is a flow chart defining the procedure programmatically, and to FIG. 7, which is a system block diagram depicting the general nature of a preferred operating drive system. Although the nature and implementation of a typical operational such system is within the skill of the art after contemplation of the present specification and drawings, reference is made one again to copending applications Serial Nos. 280,138, 589,146, and 597,012 all assigned to the assignee of the present invention.

Describing the servo-writing process in terms of tape-form media, the blank tape 10 (depicted in FIG. 7 as housed in a cartridge 11) is mounted upon the user's tape drive in the usual manner for read/write operation, and in the servo-writing procedure the first step is to locate the actual edge of the media, or of the recordable field thereon. This may be accomplished in accordance with a known procedure utilized in open-loop-positioning "edge-referencing"0 tape drives, according to which the transducer (labeled 62 in FIG. 7) is brought to a "home" position in which its recording gap (63 in FIG. 7) is located adjacent the media (actually off the recordable field) and the tape is run to one or the other of its end extremities, typically the "beginning" of the tape. The transducer is then energized to "write" (record) a standard reference signal, and is moved laterally (by the stepper motor 64, cam 65, cam follower arm 66 and head slide 67 of FIG. 7) in a timed succession of steps toward the centerline of the tape, while the tape is transported past the head (by the capstan 72, motor 72 and motor driver 74, FIG. 7) in the usual recording manner. After a brief sequence of time known to be sufficient to record a "stair step" pattern on the tape from a position commencing off the edge to a position well onto the tape, the recording operation just described is terminated, the direction of tape transport is reversed, and the head is switched to a "read" mode (all under control of microprocessor 82) while it is moved toward the edge from which it began movement, i.e., the edge adjacent the "home" position. In this procedure, when the detected "read" signal drops to a predetermined level (which may be zero, or some percentage less than full-level read signal) while the tape is still moving back toward its beginning position, the actual edge of the media, or of the recordable field on the media, will have accurately been determined regardless of the particular physical position of the tape cartridge within the drive, or of the position of the tape within the cartridge, etc.

In the preferred embodiment in accordance herewith, the "home" position of the transducer is established by a physical stop on the head-positioning cam, as disclosed more fully in copending application Ser. No. 589,146, and the cam is driven by a servo-controlled stepper motor whose drive pulse actuation is monitored, and accumulated, by a counter. Accordingly, each step of the motor which positions the transducer has a corresponding count, which constitutes the address of the particular transducer position resulting from the stepper motor position involved. The particular such address identifying the position of the transducer when indexed over the edge of the media or recordable field which has been located may thus readily be retained in memory as an address for the starting position to be used on that particular sample of media, or tape, in servo writing it.

Based upon the address determined for the actual starting position at the edge of the media field, as just described, the transducer may be stepped on an open-loop basis to any given location across the width of the media, since the width of the media is of course known and the extent of head movement corresponding to each pulse of excitation applied to the step motor is also accurately known. Thus, by applying a pretermined number of pulses to the stepper drive motor, the transducer may be moved a known physical extent relative to the accurately-located edge of the media. In accordance herewith, each such unit of transducer movement during the servo-writing procedure corresponds to one-half of the desired overall track width for user data recording purposes, i.e., one-half of the width of each track for which positioning information is to be placed upon the media.

Figure 5A:
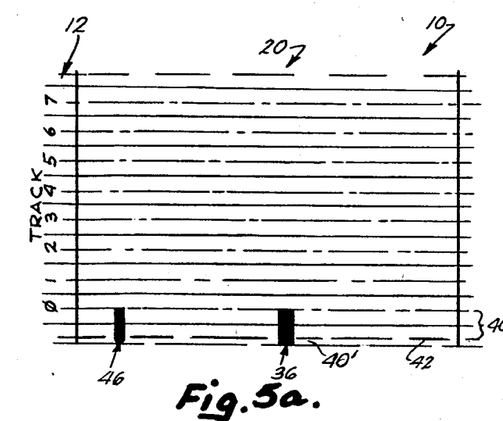
FIGS. 5(a)–5(r), inclusive, comprise a successive series or sequence of illustrations depicting the successive steps in the present servo-writing process.
Figure 5B:
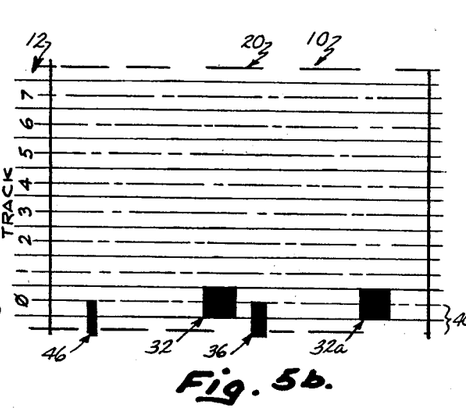
Figure 5C:
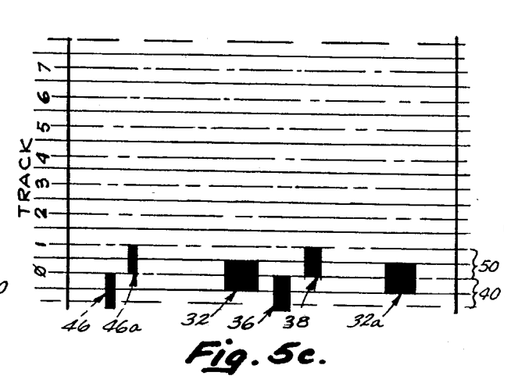
Figure 5D:
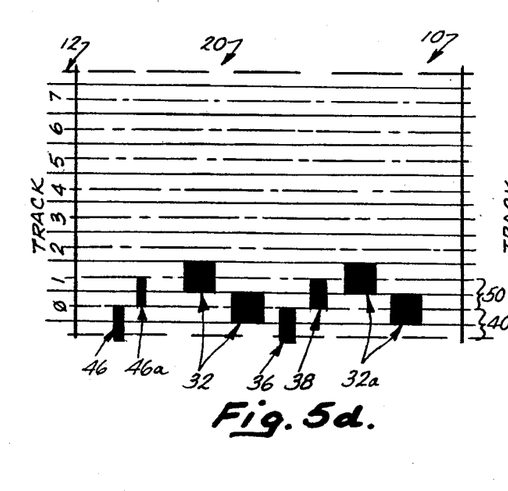
Figure 5E:
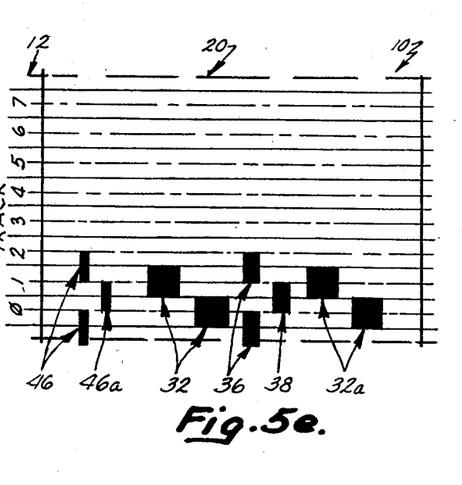
Figure 5F:
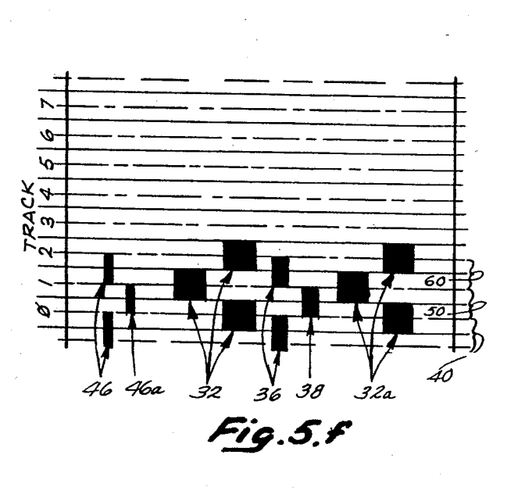
Figure 5G:
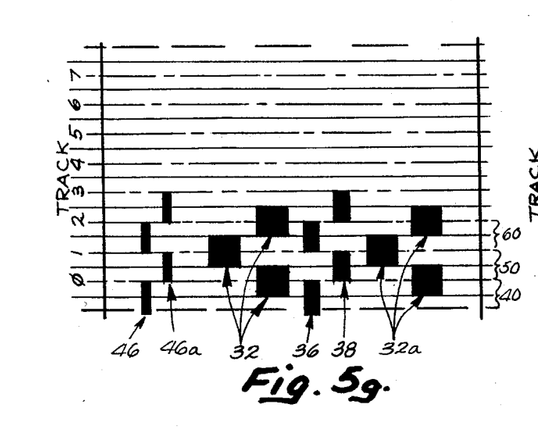
Figure 5H:
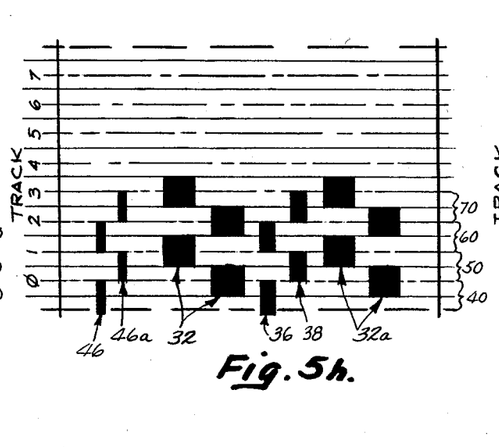
Figure 5I:
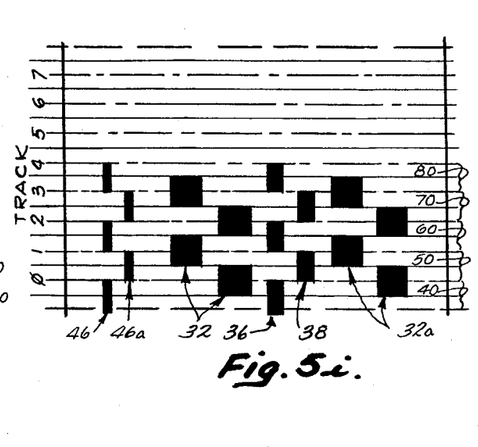
Figure 5J:
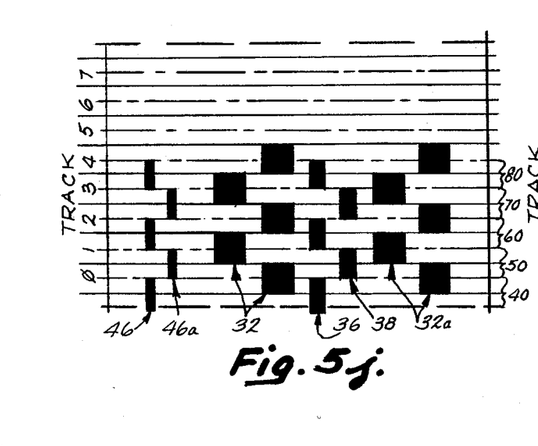
Figure 5K:
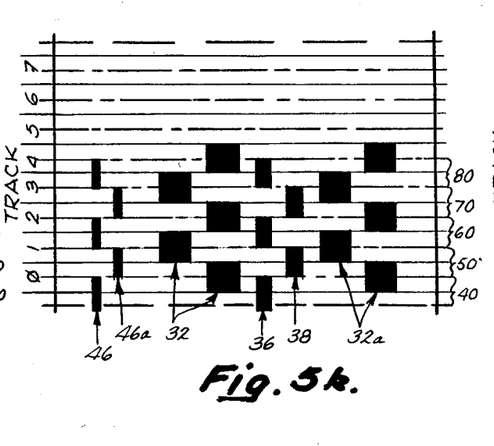
Figure 5L:
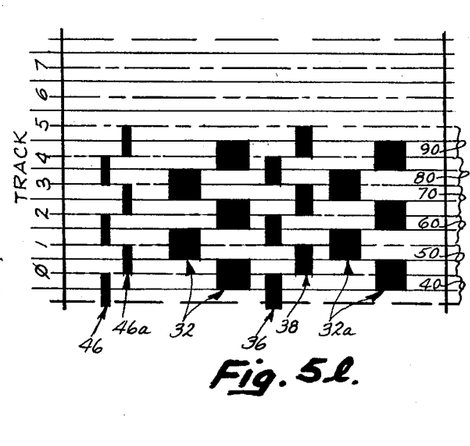
Figure 5M:
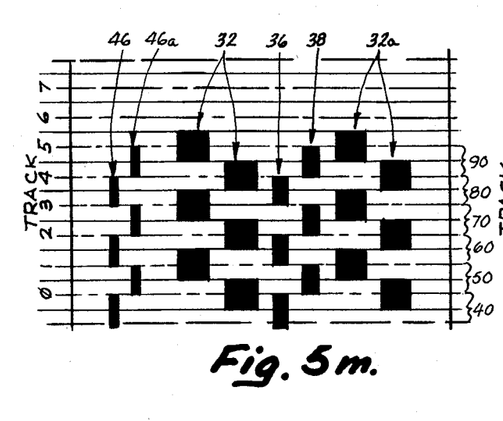
Figure 5N:
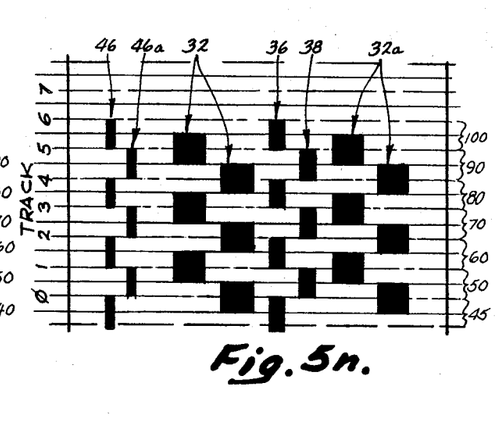
Figure 5O:
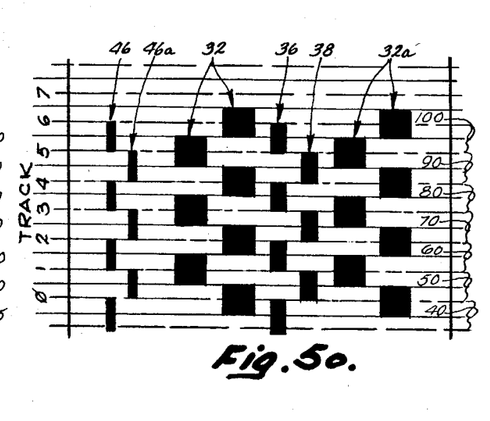
Figure 5P:
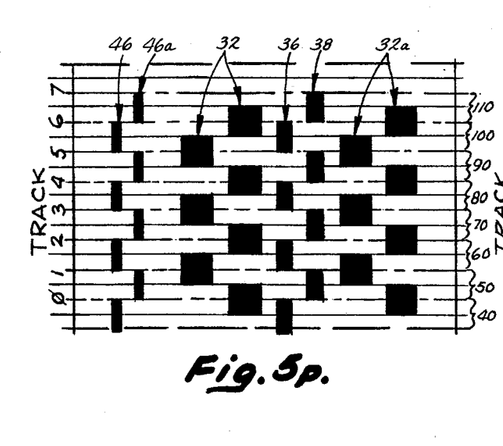
Figure 5Q:
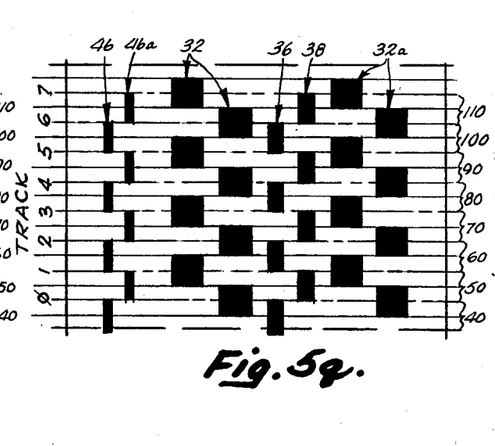
Figure 5R:
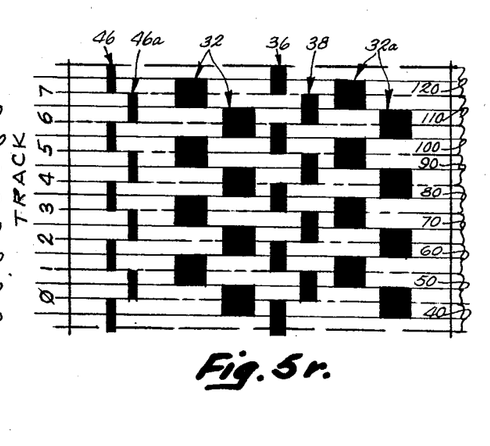
Figure 6:
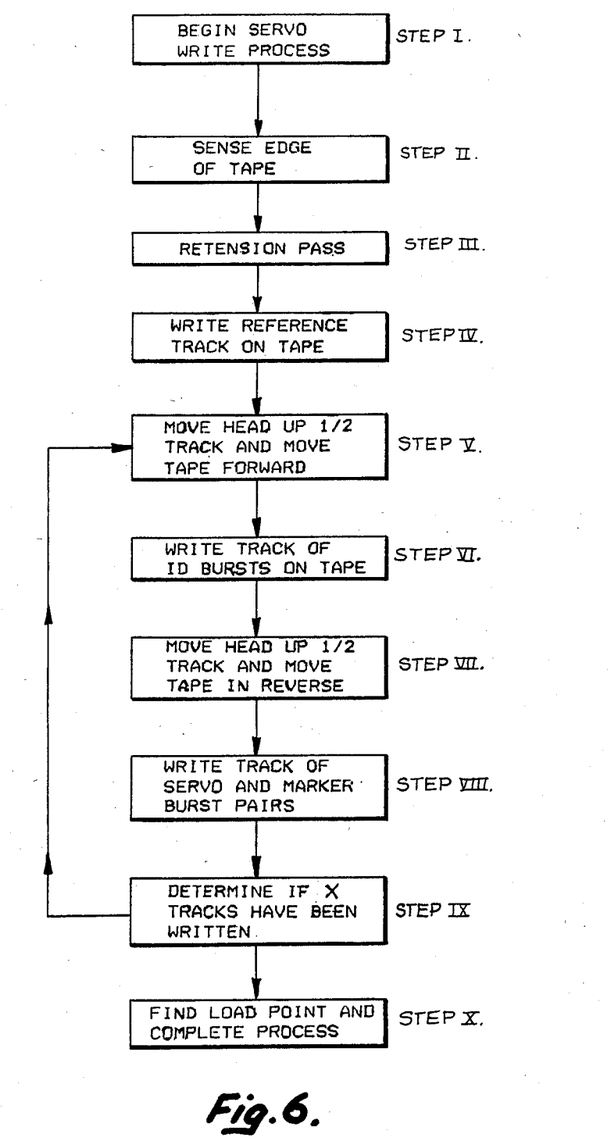
FIG. 6 is a flow chart illustrating the servo-writing process and technology.
Figure 7:
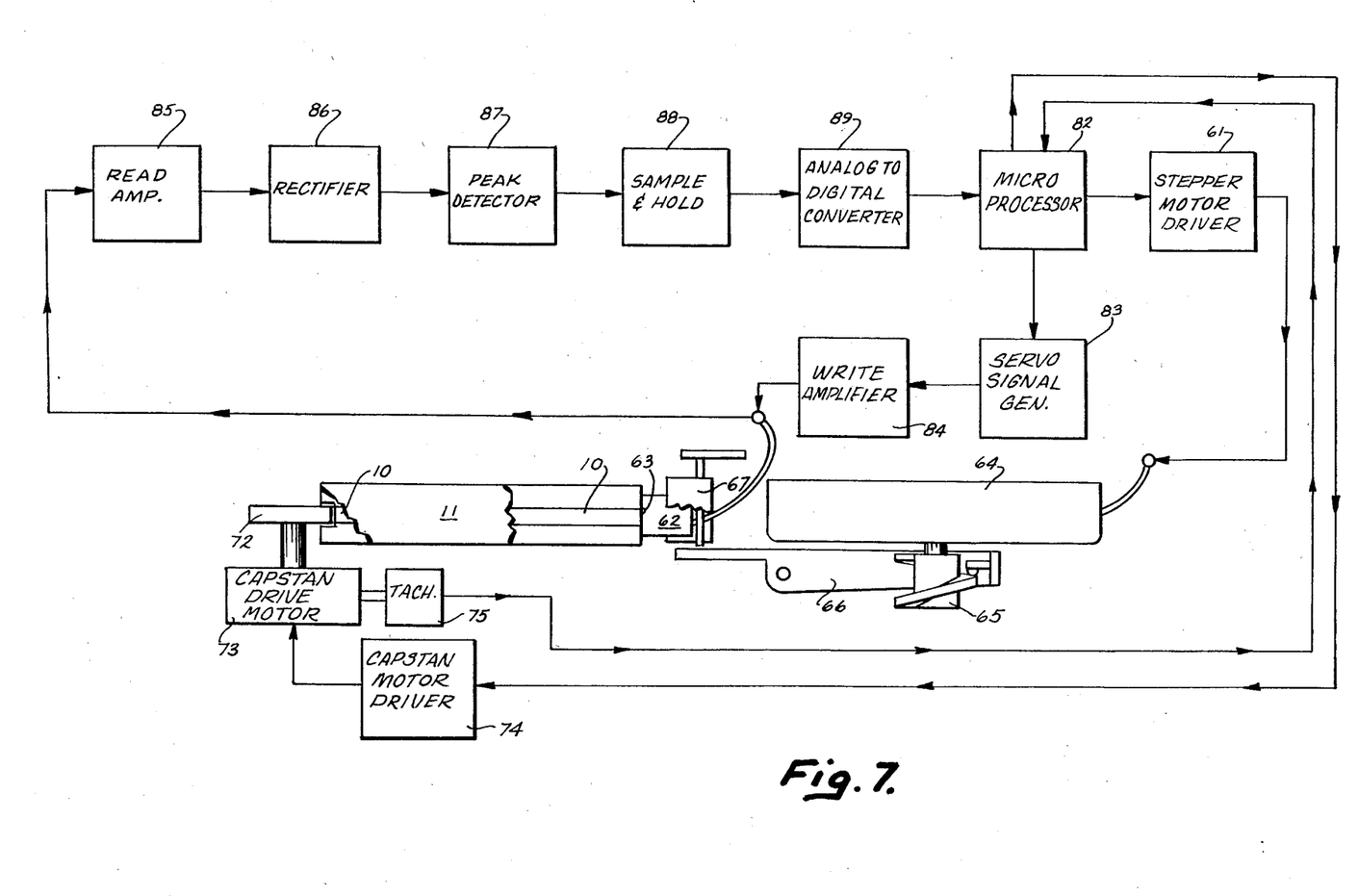
FIG. 7 is a system block diagram showing the nature of the storage apparatus (drive and controller) used for practicing the process of the invention.

Referring to FIGS. 5, 6 and 7, and having the foregoing transducer-moving procedure in mind, the initializing, or servo-writing process, in accordance herewith is commenced initially by the media edge-sensing process noted above (FIG. 6, Steps One and Two), at the conclusion of which a cumulative or resultant stepper drive count will have been produced whose value identifies the condition wherein the transducer is positioned in a "start" position, i.e., in alignment with a track at the edge of the recordable field on the media, identified by the numeral 40 in FIG. 5(a) (the actual physical edge of the media typically being the edge of the recordable field as well, but indicated separately for convenience by the dashed line 42). The stepper drive count so produced serves as an address for the corresponding transducer "start" position, and also provides a basis for readily producing an analogous address for each of the recording tracks which are to be defined across the width of the media (in FIG. 5, eight such tracks being identified as track o through 7, inclusive). That is, the desired width for each of the recording tracks is known, as is the nominal distance which the transducer-positioning system moves the transducer for each step (or half-step) of motor rotation; thus, the number of steps of stepper motor rotation (and resultant positioning cam movement) required to move the head to the location of any given one of the various adjacent tracks may readily be determined, and track addressing is a simple matter of using the particular stepper count corresponding to the address for the start position, at marginal bank 40 and incrementing that count by the particular number of steps required to move the transducer head the required distance. Thus, an address is readily available for each of the desired number of tracks, each track address thus equating to a particular count in the total stepper rotation, commencing at some "start" position a known number of steps away from the end of allowable cam travel (the "home" position).

After establishing the address ffor the edge-of-tape band 40, preferably in the above manner, the preliminary edge-locating transitions recorded on the media are erased during a first pass, or partial pass, of the media. Also, where tape is the media involved, it is desirable to run the tape from the starting end all the way to the other end, in a re-tensioning pass, which is a procedure that most manufacturers recommend be carried out prior to any data-writing or like recording activities. This corresponds to Step Three in the flow chart of FIG. 6, and Step Four corresponds to the recording illustrated in band 40 of FIG. 5(a), in which Figure only a single servo block 20 is illustrated, it being understood that the overall recording format along the entire length of the tape 10 will have many such servo blocks located in accordance with FIGS. 1 and 2, and discussed above. As illustrated in FIG. 5(a), the marginal edge band 40, which includes the lower half of data track o, plus any edge extremity 40' extending along the physical extremity of the tape and constituting an area of decreased recordability falling outside of the primary recording field, referred to herein as the recordable area or recordable field of the media. Within the band 40, during the first pass of the servo-writing procedure (Step Four in the flow diagram of FIG. 6) two different types of bursts or signals are recorded on the media. These constitute a servo-positioning burst 36 and a "marker" burst 46, one of each being located within each of the servo blocks 20 in the positions indicated, i.e., the marker burst 46 preceding the forwardly-encoded track-identification block 32 (labeled "F"), and the servo-positioning burst 36 following this same track-identification segment. The entire band 40 is recorded in this manner, with a continuous sequence of positioning blocks 20 in the dedicated areas 14 and 13 at the end extremities of the tape, and with one such positioning block between each of the data records 18 along the length of the tape between the dedicated areas. The placement of the bursts 36 and 46 so recorded is determined on the basis of tape length transported, i.e., commencing at the end extremity of the tape (e.g., at the EOT signal 13a), the above-mentioned tach generator (75, FIG. 7) associated with the tape transport drive motor may be used as a basis for "counting" the length of tape (or other media) moved from one time to another, and particular counts in the sequence of tachometer signals may be used to trigger the placement of the recorded bursts 36 and 46 (by microprocessor 82), to produce the sequence and spacing represented by the format shown in FIGS. 1 and 5.

When the opposite end of the tape has been reached (e.g., corresponding to the beginning area 12 shown in FIG. 1), the tape transport drive is momentarily terminated, and the transducer-positioning stepper motor is energized (Step Five, FIG. 6) by applying a sufficient number of pulses of excitation to move the transducer (on an open-loop basis) over a distance corresponding to half a track, i.e., into full alignment with data track o. When the transducer has reached that position, another end-to-end movement of the tape media (Step Six, FIG. 6) is initiated (by microprocessor control) through actuation of the tape transport motor, and during this transport the two track-identification header blocks 32 and 32a are recorded (by microprocessor enablement of servo signal generator 83 and write amplifier 84), both such header blocks being recorded in each of the servo areas 20 wherever they appear along the entire length of the tape. Positioning of these track-identification headers is based upon sensing the marker burst and servo burst recorded in the previous pass, for each of the positioning blocks 20. That is, referring to FIG. 5(b), with the transducer in effect positioned over the beginning of data track o and the tape moved with respect to the transducer, marker burst 46 will first be detected by the transducer (operated in a "read" mode) inasmuch as that burst occupies half of the width of track o. Using the detection of that marker burst as a basis, the preferred procedure is to time-out the desired interval between the position of the first marker burst and the desired position for the forward header 32, whereupon the transducer is switched (by microprocessor control) to a "write" mode and the forwardly-encoded track-identification burst written. Immediately following such writing, a second timed interval is commenced and at its conclusion the reversely-encoded header 32a is written. As stated, this procedure continues throughout the length of track o, detection of each marker burst 46 triggering a timed interval followed by the writing of a forward header 32, whereupon another interval is timed out and at its conclusion a reverse header 32a is written. Upon reaching the ending portion 13 of the tape, the tape transport is again interrupted, and the transducer-positioning stepper is again incremented to move the transducer another half-track across the length of the tape, so as to align the transducer with the area 50 indicated in FIG. 5(c) (corresponding to Step Seven in the flow chart of FIG. 6).

The remaining steps required to fully initialize the recording media are in essence a repeat of the steps described above, as indicated by Steps Eight and Nine in the flow chart of FIG. 6, and the indicated return to Step Five from Step Nine in the event the desired total number of tracks (actually, track-wide recording passes, e.g., area 40, data track o, area 50, etc.) In each successive recording pass, either a set of marker bursts 46 and servo bursts 36 or 38 is written, or else a set of the forwardly and reversely-encoded track-identification headers 32 and 32(a) is written, the full length, or effective length, of the media being transported past the head during each such successive pass, which in the case of the tape media under discussion is an end-to-end transport of the tape media. This progressive recording technique, during which the transducer head is moved in distance increments corresponding to one-half of a full track width, is illustrated progressively in the different portions of FIG. 5, from FIG. 5(a) to FIG. 5(r), until such time as all of the desired tracks have been fully recorded. At this point, Step Nine of the flow chart will return an affirmative determination, and the process will thus advance to Step Ten, in which the transducer is returned to its cartridge-load "home" position, the tape having been rewound to its starting end during the last pass, over the area designated 120 (FIG. 5[r]).

Each of the resulting "servo burst" or positioning blocks 20 along each track thus includes an offset pair of the marker bursts 46, 46a, followed by a gap of moderate duration, then a forwardly-encoded track-identifying header 32 which is followed almost immediately by the A and B servo bursts 36 and 38, after which, following a brief gap, a reversely-encoded track-identification header 32a. Of course, it should be remembered that (as explained more fully above) the embodiment illustrated in the various Figures and discussed herein is couched in terms of the use of tape media, in connection with which a serpentine recording pattern is contemplated, i.e., track o is written from left to right, track I is written from right to left, etc. In the pattern of recorded "positioning information" or "positioning signals" illustrated in FIG. 5 (especially, FIG. 5[a]), the marker bursts 46, 46a are thus used only during the servo-writing "initializing" process, in the manner and for the purpose explained above. During the actual operation of the tape drive, as for data-storage purposes, the marker bursts 46, 46a perform no function and are in effect ignored. Thus, they need not be erased at the conclusion of the servo-writing operation, but may instead simply be left in place. To help ensure differentiation, or delineation, between the marker bursts 46, 46a and the other bursts in the positioning sector 20, it is desirable to make the marker bursts of relatively narrow width, for example on the order of only 250 microseconds, whereas the servo bursts 36, 38 are to be on the order of one millisecond duration, and thus are four times as long as the marker bursts. The track-address bursts or headers 32, 32(a) are on the order of twice as long as the servo bursts, their actual length being dependent upon the amount of information desired to be incorporated within these patterns, i.e., how many bit cells are needed. Of course, it must also be remembered that detection and "reading" of the positioning blocks 20 is also accomplished by use of system-generated clocking sequences commenced at selected points and based upon specified recording patterns, by which "windowing" techniques may be employed to enable the read chain only where desired (i.e., where a track-identifying header burst is anticipated, or where servo-positioning bursts are anticipated). In this manner, the area of the media where the marker bursts are recorded may simply be windowed out, and thus not read at all.

In view of the above discussion and information, the nature and details of the recording media-initializing process in accordance with the invention is no doubt now well understood, and this is also believed true with respect to the system shown in FIG. 7, particularly when considered in conjunction with the various co-pending applications incorporated by reference and referred to above. As will be understood by those skilled in the art, the various components indicated by the labelled and identified blocks contained in FIG. 7 may be implemented by conventionally-available apparatus and used in accordance with generally known techniques, once the purpose and methodology set forth above are studied and appreciated. While not specifically noted above, the "read chain" of the system, as shown in FIG. 7, preferably includes an initial amplifier 85 coupled to the read output from head 62 and particularly to accommodate decoding of the track-identification headers as depicted in FIG. 4, the output of amplifier 85 is preferably coupled to a rectifier 86, peak detector 87, and a sample-and-hold network 88. The resulting analog signal is coupled through an A/D (analog-to-digital) converter 89, and the digitized output is applied to the aforementioned microprocessor 82 for final decoding and system control functions in response thereto, as described above. While functional A-to-D conversion is unquestionably well within the abilities of those skilled in the art, a particular preferred example of a non-conventional A-to-D conversion is disclosed in copending application Ser. No. 597,012, to which reference is made for all necessary or desirable purposes.

It should now be appreciated that the present invention provides a novel and useful system and methodology for initializing data-storage media, in which the user's own storage device (media drive) is utilized, in a simple and automated process which can readily be accomplished even by inexperienced persons during periods of time in which data-processing operations are not ongoing. Accordingly, complex, expensive, and time-consuming special-purpose servo-writers are not necessary, and the user may simply initialize his own media (tape-form or otherwise) by using conventional blank media in the same form as is available from numerous suppliers on a competitive and favorable basis, with respect to both price and delivery, etc.

It is to be understood that the above is merely a description of a preferred embodiment of the invention and that various changes, alterations and variations may be made without departing from the underlying concepts and broader aspects of the invention as set forth in the appended claims, which are to be interpreted in accordance with the established principles of patent law, including the doctrine of equivalents.

The embodiments of the invention in which an exclusive property or privilege is claimed are defined as follows.

1. A method of initializing data-recording media for subsequent data storage use by pre-recording transducer-positioning signals thereon through use of the same general type of data storage device which is to be used in recording data on such media, said method comprising the steps of: locating a lateral edge of the recordable field on said media while the media is mounted for recording operation on such type of data storage device; positioning the transducer of such data storage device in operative transducing alignment with the marginal edge portion of said recordable field on said media at a first location; transporting said media longitudinally relative to said transducer along a path generally parallel to the axis of a desired recording track, while maintaining said transducer at said first location; selectively and periodically actuating said transducer during the said longitudinal transport of said media to record a first series of mutually-spaced positioning signals on said media; moving said transducer laterally with respect to said media to a new position further inward of the said recordable field on the media constituting a second location, and transporting said media longitudinally relative to said transducer along a path generally parallel to the axis of a desired recording track while maintaining said transducer at said second location; detecting the presence of at least certain of said recorded positioning signals in said first series thereof during said second longitudinal transport of said media, and actuating said transducer in timed response to detection of at least certain positioning signals in said first series thereof so as to record a second series of mutually-spaced positioning signals on said media located generally adjacent said first series and in a predetermined timed relationship with respect thereto; and repeating said steps of moving said transducer laterally with respect to said media a succession of times to a succession of new positions representing additional such locations, transporting said media longitudinally relative to said transducer while maintaining the latter at each of the said successive new locations, detecting the presence of at least certain of the positioning signals recorded on the media during a previous longitudinal transport of the media, and actuating said transducer in timed response to said detection of previously-recorded positioning signals so as to record a desired number of additional series of said spaced positioning signals on said media, each such series being in longitudinal alignment with one another and positioned generally adjacent a previously-recorded series and in predetermined timed relationship with respect thereto.

2. The method recited in claim 1, including the steps of recording at least certain of said positioning signals in the form of servo-positioning signals located on half of a data-recording track and having characteristics useable in closed-loop servo positioning of said transducer during subsequent data-recording and reproducing operations to maintain mutual alignment of said transducer and said track.

3. The method recited in claim 1, including the steps of recording at least certain of said positioning signals in the form of track-identification signals positioned along the axis of a data-recording track and embodying an encoded identification of that particular track.

4. The method recited in claim 1, including the steps of actuating said transducer to record at least certain of said positioning signals in the form of marker signals comprising extraneous recorded indicia of a type other than those provided for use as servo-positioning signals and/or as track-identification signals.

5. The method recited in claim 1, wherein at least certain of said steps of moving said transducer laterally with respect to said media are carried out by moving said transducer a distance corresponding substantially to one-half the full width of a data-recording track.

6. The method recited in claim 5, wherein at least certain first types of the said positioning signals in said series thereof are recorded by said transducer so as to have a width in a lateral direction with respect to said media which corresponds substantially to the full width of a data-recording track.

7. The method recited in claim 6, wherein at least certain of said first types of positioning signals which have a width corresponding substantially to a full data track width are recorded in an offset position with respect to the centerline of the data track along which such signals are disposed.

8. The method recited in claim 7, wherein said transducer-moving steps and said recording steps are carried out so as to locate said data-recording tracks in substantially contiguous side-by-side relation, and so as to locate said laterally-offset positioning signals in a position extending generally from the centerline of one track to the centerline of the track next adjacent.

9. The method recited in claim 8, wherein said transducer-moving steps and said recording steps are carried out so as to locate said data-recording tracks in substantially contiguous side-by-side relation, and so as to locate said laterally-offset positioning signals in mutually-spaced and non-overlapping relation along the length of contiguous tracks.

10. The method recited in claim 9, wherein at least certain other types of said positioning signals in said series thereof are recorded by said transducer so as to be centered upon the longitudinal axis of certain of said data-recording tracks, and so as to locate said centered positioning signals in mutually-spaced and non-overlapping relation along the length of each said contiguous track.

11. The method recited in claim 1, wherein said step of locating a lateral edge of the recordable field on the media while the media is mounted in operative recording operation on the data storage device comprises actuating said transducer to record a progression of signals along the edge of the media, using said transducer to reproduce the signals so recorded, and using anomalies in such signal reproduction to designate the edge of the recordable field on the media.

12. The method recited in claim 1, including the steps of using an incrementally-driven positioner means for moving said transducer laterally with respect to said media, and maintaining an ongoing count of the drive increments undergone by said positioner means during said initializing to thereby determine the instantaneous position of the transducer during initializing.

13. The method recited in claim 12, including the steps of retaining at least certain of said counts in a memory and using such retained counts to return the transducer to a particular desired position represented by a particular retained count.

14. The method recited in claim 13, including the steps of retaining at least certain of said counts in a memory and using such retained counts as a basis for moving said transducer to a desired position relative to the width of said media by incrementally driving said positioner means the number of increments required to change the count from a particular retained value to a different value constituting the count which corresponds to that at which the positioner means has brought the transducer to the desired position.

15. The method recited in claim 14, including the step of using as said retained counts at least the count at which the positioner means positions the transducer in a "start" location at the edge of the recordable field on the media.

16. The method recited in claim 14, wherein said desired position for said transducer is achieved by determining the number of incremental drive counts required to move the transducer over a distance corresponding to the difference between the drive count for the desired position and said retained count, using the number of incremental drive counts so determined as a reference count for a comparison function, incrementing or decrementing a counter in response to the applied increments of positioner drive, comparing the said comparison reference count to the changing incremented or decremented count of said counter as the positioner means moves the transducer until such two steps are the same, and stopping the incremental drive at the point where comparison occurs, said point representing the condition wherein the transducer has been brought to the desired position.

17. The method recited in claim 14, wherein said particular retained value comprises the count at which the positioner means has brought the transducer to a "start" location at the edge of the recordable field on the media.

18. The method recited in claim 17, wherein said desired position relative to the width of the media comprises the location of a second data-recording track which is disposed generally parallel to a first such track and which extends generally along the edge of the recordable field on the media but which is spaced inwardly of such first track with respect to the width of the recordable field.

19. The method recited in claim 18, including the steps of retaining in memory for future use the particular count of ongoing drive increments corresponding to that at which the transducer-positioner means has brought the transducer into registry with said second data-recording track, and using such retained count as an address for subsequently positioning said transducer in alignment with said second track.

20. The method recited in claim 19, including the steps of retaining in memory for future use each of the particular counts of ongoing drive increments which corresponds to that at which the transducer-positioner means has brought the transducer into registry with each of a plurality of data-recording tracks, and using such retained counts as an address for subsequently positioning said transducer in selective alignment with any of said plurality of tracks.

21. The method recited in claim 20, including the step of determining said address counts by incrementing a counter which maintains the ongoing count a plurality of times by adding a fixed number of counts to the count at which the positioner means has brought the transducer to a "start" location at the edge of the recordable field on the media.

22. A method of initializing tape-form data-recording media by pre-recording transducer-positioning signals thereon, comprising the steps of: positioning the read-/write transducer of a tape drive device adapted to utilize said tape-form media in operative transducing alignment with a first area extending partially across the width of the tape media; transporting said tape longitudinally in a first direction past said transducer along a path generally parallel to the edges of the tape, while maintaining said transducer in its said position of transducing alignment; actuating said transducer to selectively and periodically record a first series of mutually-spaced and aligned positioning signals along the length of said tape during said longitudinal transport of the tape; moving said transducer laterally with respect to said tape to a different position of transducing alignment therewith at a second area extending partially across the width thereof; transporting said tape longitudinally in a direction opposite said first direction and along a path generally parallel to the edges of the tape, while maintaining said transducer at said second area with respect to said tape and in said position of transducing alignment; detecting the presence of at least certain of said recorded positioning signals in said first series thereof during said opposite-direction tape transport, and actuating said transducer in timed response to detection of at least certain positioning signals in said first series thereof so as to record a second series of mutually-spaced and aligned positioning signals along the length of said tape in a track generally parallel to that of the first such series; and repeating said steps of moving said transducer laterally with respect to said tape to successive different positions of transducing alignment therewith at successive different areas extending partially across the width thereof, transporting said tape longitudinally past said transducer at each of said different positions of transducer alignment and alternating the direction of tape movement with each successive such longitudinal pass, detecting the presence of at least certain of the positioning signals recorded on the tape during a previous longitudinal transport of the tape, and actuating said transducer in timed response to said detection of previously-recorded positioning signals so as to record a desired number of additional series of said spaced positioning signals on said media, each such series being in longitudinal alignment with one another and positioned generally adjacent a previously-recorded series and in predetermined timed relationship with respect thereto.

23. The method recited in claim 22, including the steps of recording at least certain of said positioning signals in the form of track-identification signals recorded along the axis of a data-recording track and embodying an encoded identification of that particular track.

24. The method recited in claim 23, including the steps of recording said track-identification signals with forward and reverse encoding formats in alternating adjacent data-recording tracks to accommodate said alternating directions of tape movement.

25. The method recited in claim 23, including the steps of recording at least certain of said positioning signals so that they comprise servo-positioning signals recorded on half of a data-recording track and having characteristics useable in closed-loop servo positioning of said transducer during subsequent data-recording and reproducing operations to maintain mutual alignment of said transducer and said track.

26. The method recited in claim 22, including the steps of actuating said transducer to record at least certain of said detected positioning signals in the form of marker signals comprising extraneous recorded indicia of a type other than those provided for use as servo-positioning signals and/or as track-identification signals.

27. The method recited in claim 22, wherein at least certain of said steps of moving said transducer laterally with respect to said tape are carried out by moving said transducer a distance corresponding substantially to one-half the full width of a data-recording track.

* * * * *

UNITED STATES PATENT AND TRADEMARK OFFICE
CERTIFICATE OF CORRECTION

PATENT NO. : 4,586,094

DATED : April 29, 1986

INVENTOR(S) : John M. Chambors and Francis Lum

It is certified that error appears in the above-identified patent and that said Letters Patent is hereby corrected as shown below:

Column 1, line 25:
"far" should be -- for --.

Column 1, line 44:
"472,750" should be -- 4,472,750 --.

Column 5, line 7:
"durationx" should be -- duration x --.

Column 5, line 67:
"B (3)" should be -- B(3) --.

Column 8, line 2:
"tapeform" should be -- tape-form --.

Column 9, line 19:
"one" should be -- once --.

Column 9, line 30:
'"edge-referencing"0' should be -- "edge-referencing" --.

Column 10, line 46:
"o" should be -- ∅ --.

Column 10, line 56:
"bank" should be -- band --.

Column 10, line 65:
"ffor" should be -- for --.

Column 11, line 15:
"o" should be -- ∅ --.

UNITED STATES PATENT AND TRADEMARK OFFICE
CERTIFICATE OF CORRECTION

PATENT NO. : 4,586,094

DATED : April 29, 1986

INVENTOR(S) : John M. Chambors and Francis Lum

It is certified that error appears in the above-identified patent and that said Letters Patent is hereby corrected as shown below:

Column 11, line 54:
    "o" should be -- ∅ --.

Column 12, line 1:
    "o" should be -- ∅ --.

Column 12, line 5:
    "o" should be -- ∅ --.

Column 12, line 15:
    "o" should be -- ∅ --.

Column 12, line 32:
    "o" should be -- ∅ --.

Column 12, line 64:
    "o" should be -- ∅ --.

Column 17, line 1:
    "corresponds" should be -- correspond --.

Signed and Sealed this

Seventh Day of October, 1986

[SEAL]

*Attest:*

DONALD J. QUIGG

*Attesting Officer*  *Commissioner of Patents and Trademarks*